United States Patent [19]

Engelbeck et al.

[11] Patent Number: 5,452,340

[45] Date of Patent: Sep. 19, 1995

[54] METHOD OF VOICE ACTIVATED TELEPHONE DIALING

[75] Inventors: George E. Engelbeck; Monica A. Marics, both of Boulder, Colo.

[73] Assignee: US West Advanced Technologies, Inc., Boulder, Colo.

[21] Appl. No.: 41,578

[22] Filed: Apr. 1, 1993

[51] Int. Cl.6 ...................... H04M 1/64; H04M 1/26
[52] U.S. Cl. ..................... 379/67; 379/355; 379/88
[58] Field of Search ...................... 379/67, 88, 89, 355

[56] References Cited

U.S. PATENT DOCUMENTS

| | | | |
|---|---|---|---|
| 4,320,256 | 3/1982 | Freeman | 379/76 X |
| 4,348,550 | 9/1982 | Pirz et al. | 379/88 |
| 4,578,540 | 3/1986 | Borg et al. | 379/40 |
| 4,644,107 | 2/1987 | Clowes et al. | 379/355 X |
| 4,864,622 | 9/1989 | Iida et al. | 379/355 |
| 4,928,302 | 5/1990 | Kaneuchi et al. | 379/354 |
| 5,007,081 | 4/1991 | Schmuckal et al. | 379/355 X |
| 5,204,894 | 4/1993 | Darden | 379/355 X |
| 5,325,421 | 6/1994 | Hou et al. | 379/355 X |
| 5,345,501 | 9/1994 | Shelton | 379/88 X |

OTHER PUBLICATIONS

Lawrence et al. "Case Study Development of a user interface for a Voice Activated Dialing Service", 13th International Symposium Human Factors in Telecommunications. Turin Italy 10–14 Sep. 1990 pp. 377–385.
Teja, "Repertory telephone dialer responds to human voice" Oct. 1980 EDN pp. 57–59.

Primary Examiner—James L. Dwyer
Assistant Examiner—Daniel S. Hunter
Attorney, Agent, or Firm—Timothy R. Schulte; Stephen F. Jewett

[57] ABSTRACT

The present invention relates to a method of interface between a voice activated dialing system and a user. The present invention solves the problems presented by the prior art by providing a user interface which can add a name and corresponding telephone number to a directory during the process of initiating a telephone call. In addition, the present invention provides the user the opportunity to select which element of a directory listing should be changed, using a single integrated review, erase and change functionality accessible while in a directory mode.

15 Claims, 8 Drawing Sheets

METHOD OF VOICE ACTIVATED TELEPHONE DIALING

TECHNICAL FIELD

This invention relates generally to voice activated telephone dialing systems and more particularly to a method of interface between a voice activated dialing system and a user.

BACKGROUND ART

Telephone networks have typically determined dialing information from a user based upon information obtained from the telephone keypad and by a live operator. User commands to the network were input by pulse or dual-tone multiple frequency (or DTMF) signals which were generated by the telephone instrument in response to the depression of keys on the keypad. These signals were then interpreted by the network to determine the keys depressed. Further information could also be obtained from queries from a live operator.

More recently, some telephone networks have implemented speech recognition systems in conjunction with the network user-interface with respect to the limited functions performed by the network. One example is the Automated Alternative Billing System (or AABS), an automated billing attendant implemented by several telephone companies to automatically perform many of the tasks previously performed by a live operator with regard to the solicitation of collect-call billing. In this system, the called party is automatically queried by the system to determine if they wish to accept call charges. A verbal response of "yes" or "no" is received by the system and interpreted by a speech recognition algorithm. This interpretation is fed to the network which bills or terminates the call accordingly.

U.S. Pat. No. 5,052,063 to Sakanishi et al addresses a voice-activated user-interface directed to mobile telephone dialing. This patent discloses a system whereby a series of speech templates are held in a directory residing in the local customer premise equipment (or CPE) along with corresponding telephone numbers. A driver utters a speech signal corresponding to the party which he wishes to call. The speech signal is processed and compared to the speech templates stored in the directory. If one of the stored speech templates matches the uttered speech signal, a speech signal corresponding to the stored speech template is replayed to the driver and the corresponding telephone number is dialed automatically.

Prior art user interfaces for voice activated dialing require a user to enter a separate directory function to add a new name and corresponding telephone number to the directory. Prior art user interfaces similarly lack the ability to allow the user to change a current listing. These devices require the user to perform the separate functions of erasing a current listing and adding a new listing to replace it as described above. The lack of these features creates a necessity for further user actions which decreases the efficiency of the interface.

SUMMARY OF THE INVENTION

A general object of the present invention is to solve the problems presented by the prior art devices by providing a network-based user interface for a voice activated telephone dialing system which can add a name and corresponding telephone number to a directory of telephone numbers and corresponding stored speech segments during the process of initiating a telephone call. In particular, if the user lifts the handset to dial and speaks a name which is not recognized by the system, the system will then give the user the option of adding a directory listing for that name into the directory.

A further object of the present invention is to provide the user the opportunity to select which element of a listing should be changed. The user is asked whether he or she wants to change the speech segment or the telephone number associated with the speech segment. This is particularly useful because, over time, as a user's voice changes the system's recognition accuracy tends to decrease. By allowing users to change only the stored speech segment, users save the time and trouble of having to erase and then re-add a speech segment and a corresponding telephone number for the listing.

An additional object of the present invention is to provide a network-based user interface which combines "review" "erase" and "change" features into a single element on a main menu. While in the directory mode in this interface, the user can select a speech segment corresponding to a directory listing and then indicate what type of action he or she would like to take on that listing. This provides users with a consistent syntax for editing their directories.

In carrying out the above objects, the present invention provides a method of telephone dialing in cooperation with a voice activated user interface having storage means for storing a directory of user entered speech segments and corresponding telephone numbers. The method comprises the steps of receiving a user speech segment corresponding to a party the user desires to call, comparing the user speech segment to the directory to locate one of the entered speech segments, and the corresponding stored telephone number if the user speech segment is recognized, and identify the user speech segment if it is unrecognized, automatically dialing the located telephone number, receiving a telephone number corresponding to the unrecognized speech segment, and automatically adding the unrecognized speech segment and corresponding telephone number to the directory if indicated by the user.

In further carrying out the above objects, the present invention comprises a method of providing a user interface for a voice activated telephone dialing system having storage means for storing a directory of user entered speech segments and corresponding telephone numbers. The method comprises the steps of playing one of stored speech segments and corresponding telephone number to a user, optionally replacing one of the selected speech segments with a supplemental speech segment, optionally replacing the stored telephone number corresponding to one of the selected speech segments with a supplemental telephone number, and optionally erasing one of the stored speech segments and corresponding telephone number from said directory, wherein each of the optional steps is exercised if indicated by the user.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
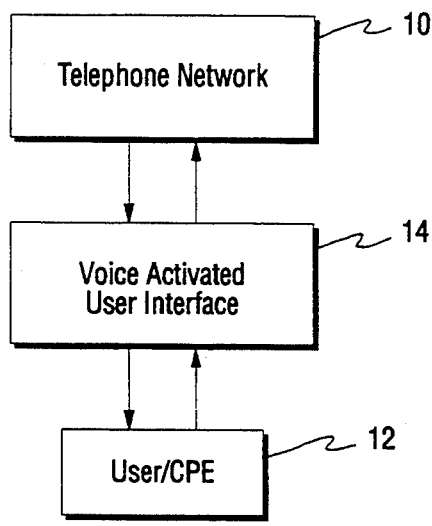
FIG. 1 is a block diagram representation of a telephone network utilizing the voice activated user interface of the present invention.

FIG. 1 illustrates a speech recognition telephone system which is the subject of the present invention. The telephone network 10 receives input from a user 12 and communicates with the user 12 via the voice activated user interface 14. The block representing user 12 includes customer premise equipment for initiating a telephone call, receiving and transmitting speech from the user and playing voice signals from a remote called party to the user in accordance with a normal telephone call.

Voice activated user interface 14 may include an input device such as a telephone keypad capable of generating signals in response to the depression of the various keys on the telephone keypad. Further, the user interface is capable of accepting, storing, and recognizing various speech signals generated by the user and responding to the user via an audio output of a digitized or a synthesized voice. The user interface includes a directory of stored speech segments coupled with corresponding telephone numbers. When a user wishes to dial a telephone number using the voice activated user interface, the user provides a speech segment corresponding to the desired number. The interface compares this speech segment to find the matching stored speech segment. The user interface then dials the telephone number in the directory corresponding to the stored speech segment found.

Figure 2:
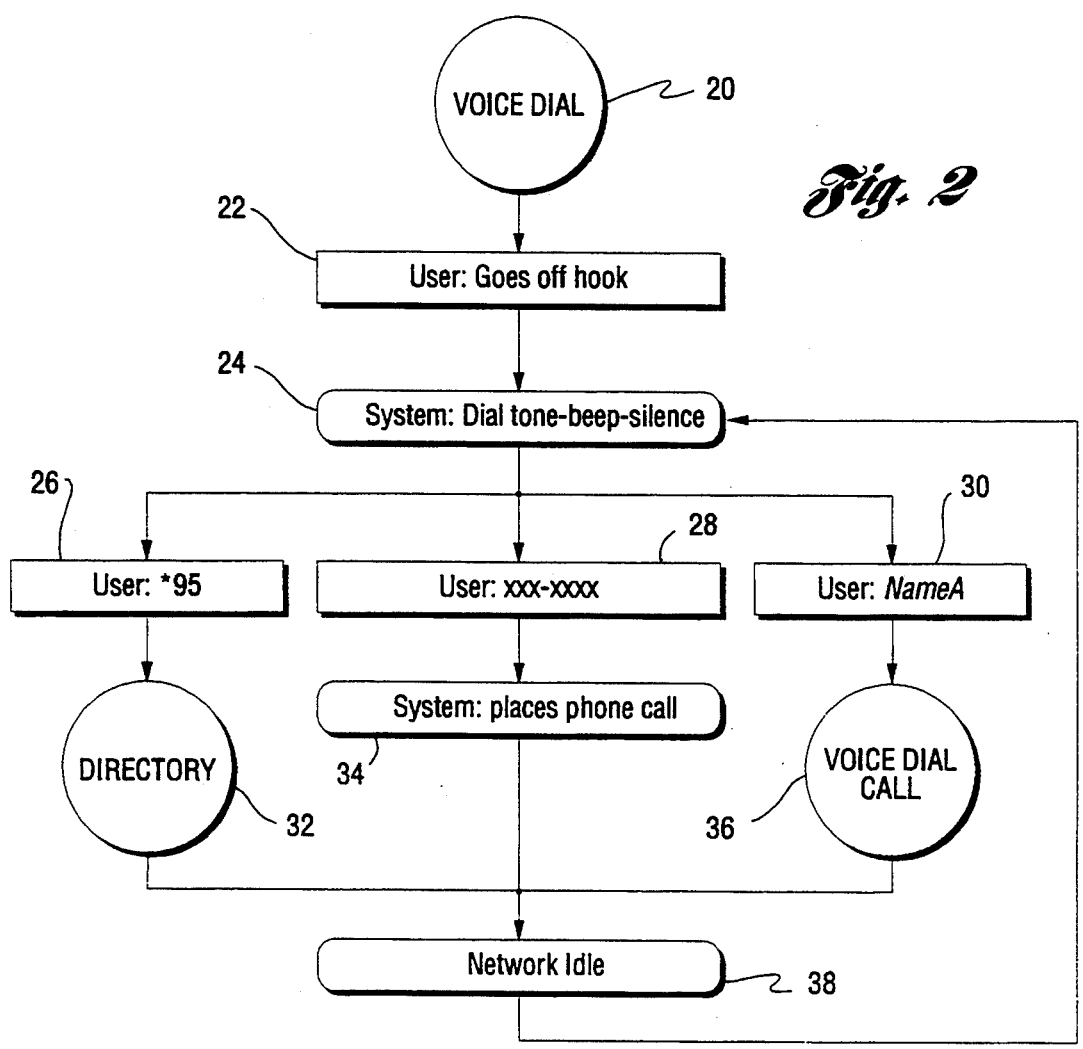
FIG. 2 is a general flow chart representation of one embodiment of the present invention.

Turning now to FIG. 2, a flow chart representing the method of implementing a voice dial function is presented. If the user takes the step of going off hook 22, the system responds as shown in step 24 by a dial tone followed by a beep and then silence. The choice of the system response in step 24 is dependent upon hardware considerations. This response could be replaced by other options such as a muted dial tone.

Following the system response, the user then has three options: if the user performs step 26 by dialing *95 on the telephone keypad, he or she will enter directory procedure 32; if the user performs step 28 of dialing a telephone number using the telephone keypad, the system will respond with step 34 by placing the call; if the user responds by step 30 by providing a speech segment, for instance, the name of the party which he or she wishes to call, he or she is routed to voice dial call procedure 36. It should be noted that the speech segment corresponding to a telephone number could be virtually any speech pattern as long as the speech patterns for different telephone numbers can be distinguished by the speech recognition algorithm. When any one of either the directory procedure 32, the voice dial call procedure 36 or the phone call 34 is completed, the network remains idle as shown in step 38 and the system returns to step 24.

Figure 3:
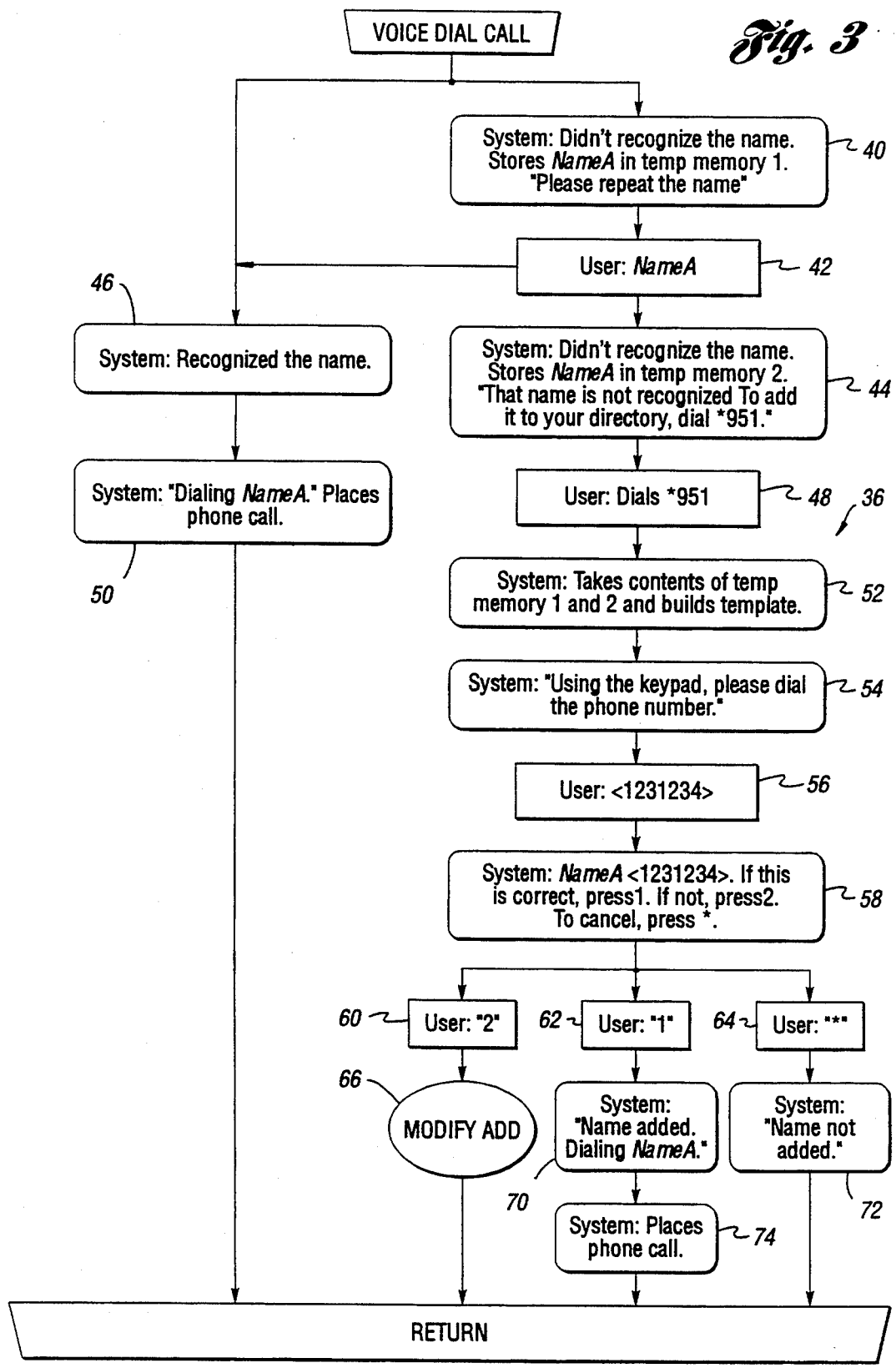
FIG. 3 is a flow chart representation of the voice dial call feature of one embodiment of the present invention.

Turning now to FIG. 3, the voice dial call procedure referred to generally by reference numeral 36 is shown in more detail. A speech recognition algorithm is executed in an attempt to recognize the name spoken provided by the user as one of the stored speech segments, possibly stored as speech templates. If the system recognizes the name as corresponding to one of the speech templates in the directory as in step 46, the system emits an audio message to the user indicating that it is dialing the spoken name and performs the step of placing the call. This audio indication is given for the convenience of the user. It could be replaced by another means such as a visual display or it could be removed altogether. If, however, the name spoken by the user is not recognized as in step 40, the user's speech segment is stored in a temporary memory register and the user is verbally prompted to repeat the name. If the new name entered by the user in step 42 is recognized as in step 46, then step 50 is performed by announcing the name of the party and placing the call.

If, however, the system does not recognize the newly entered name as in step 44, the speech segment representing that name is stored in a second temporary memory register. The user is prompted that the second name entered is not recognized, at which point the user is given the option of adding this new name to the user directory by dialing *951 on the telephone keypad. If the user enters *951 as in step 48, the system takes the contents of the first and second temporary memory registers and builds a speech template corresponding to the spoken name as shown in step 52. The system then verbally prompts the user to dial the telephone number corresponding to the spoken name using the telephone keypad as shown in step 54. If the user responds by entering a telephone number as shown in step 56, the system replays the spoken name as well as a verbal representation of the telephone number entered as shown in step 58.

The system further prompts the user to indicate if this name and telephone number are correct by pressing appropriate keys on the telephone keypad. If the user responds by pressing 2 as in step 60, the modify/add procedure 66 is performed. If the user responds by pressing a 1 on the telephone keypad as in step 62, the system adds the name and telephone number to the directory, provides a verbal indication to the user that it has performed this task as shown in step 70 and proceeds to place the call as shown in step 74. If the user responds by pressing * on the telephone keypad as shown in step 64, the system provides a verbal indication that the new name and telephone number are not added to the directory as shown in step 72.

Figure 4:
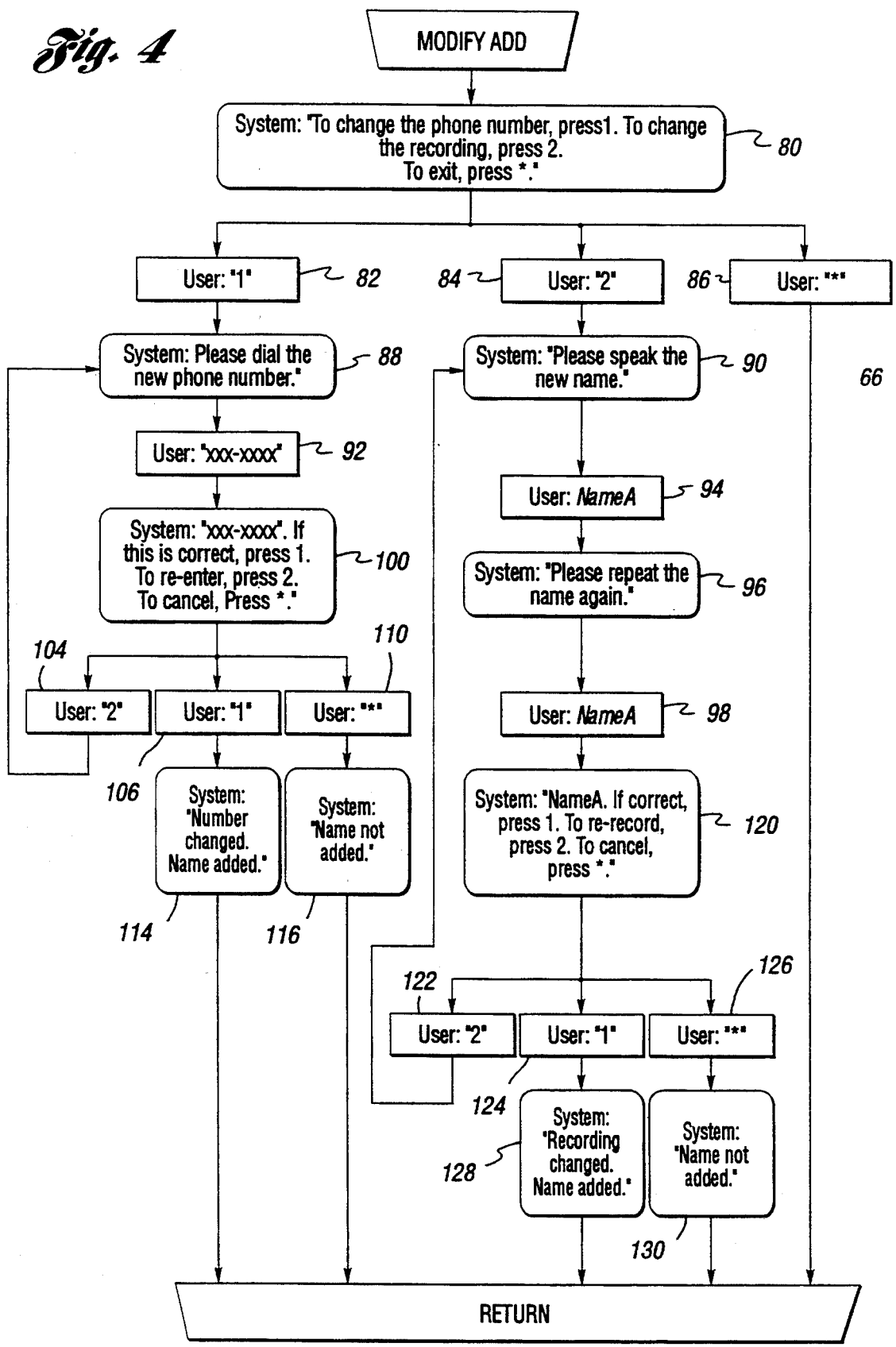
FIG. 4 is a flow chart representation of the modify-/add procedure of one embodiment of the present invention.

Turning now to FIG. 4, the modify/add procedure, referred to generally by reference numeral 66, is shown. The system prompts the user to indicate whether he or she wants to change the telephone number, change the recording, or exit this procedure based upon the key pressed on the telephone keypad as shown in step 80. If the user presses * on the telephone keypad indicating that he or she wishes to exit as shown in step 86, then the procedure is exited. If the user enters 1 as shown in step 82, then the system returns by verbally prompting the user to dial the new telephone number as shown in step 88. If the user enters a new telephone number as shown in step 92, the system replies by playing a digitized or synthesized speech representation of the telephone number and additionally prompts the user to indicate if this telephone number is correct, if the telephone number needs to be re-entered or if the user wishes to cancel, as shown in step 100.

Similarly, if the user enters a 2 on the telephone keypad as shown in step 104, indicating that the number is to be re-entered, then the system returns to step 88 of verbally prompting the user to dial a new telephone number. If the user responds by pressing 1 on the telephone keypad as shown in step 106 indicating that the entered telephone number is correct, this telephone number is stored in the directory and the system verbally indicates to the user that the number was changed as shown in step 114. If the user indicates that he or she wishes to cancel by pressing a * on the telephone keypad as shown in step 110, the system replies verbally that the name is not added to the system and the procedure is exited as shown in step 116. If the user responds by pressing 2 as shown in step 84 in response to the system prompt 80, the system replies by verbally prompting the user to speak the new name as shown in step 90. The name is entered by the user as shown in step 94 and the system verbally prompts the user to repeat the name again as shown in step 96. The name is spoken again by the user as shown in step 98. The system responds by replaying the spoken name and prompting the user verbally to determine whether the spoken name is correct as shown in step 120.

The user indicates the correctness of the spoken name as follows. If the user responds by pressing a 2 on the telephone keypad as shown in step 122, indicating that he or she wishes to re-record the spoken name, then the method returns to step 90. If the user presses a 1 on the telephone keypad as shown in step 124 indicating the name is correct, then the system creates a speech template of the recorded name and stores it in the directory and verbally indicates this to the user as shown in step 128. If the user responds by pressing a * on the telephone keypad as shown in step 126 indicating that he or she wishes to cancel and exit the procedure, then the system verbally indicates to the user that the name was not added as shown in step 130.

Figure 5:
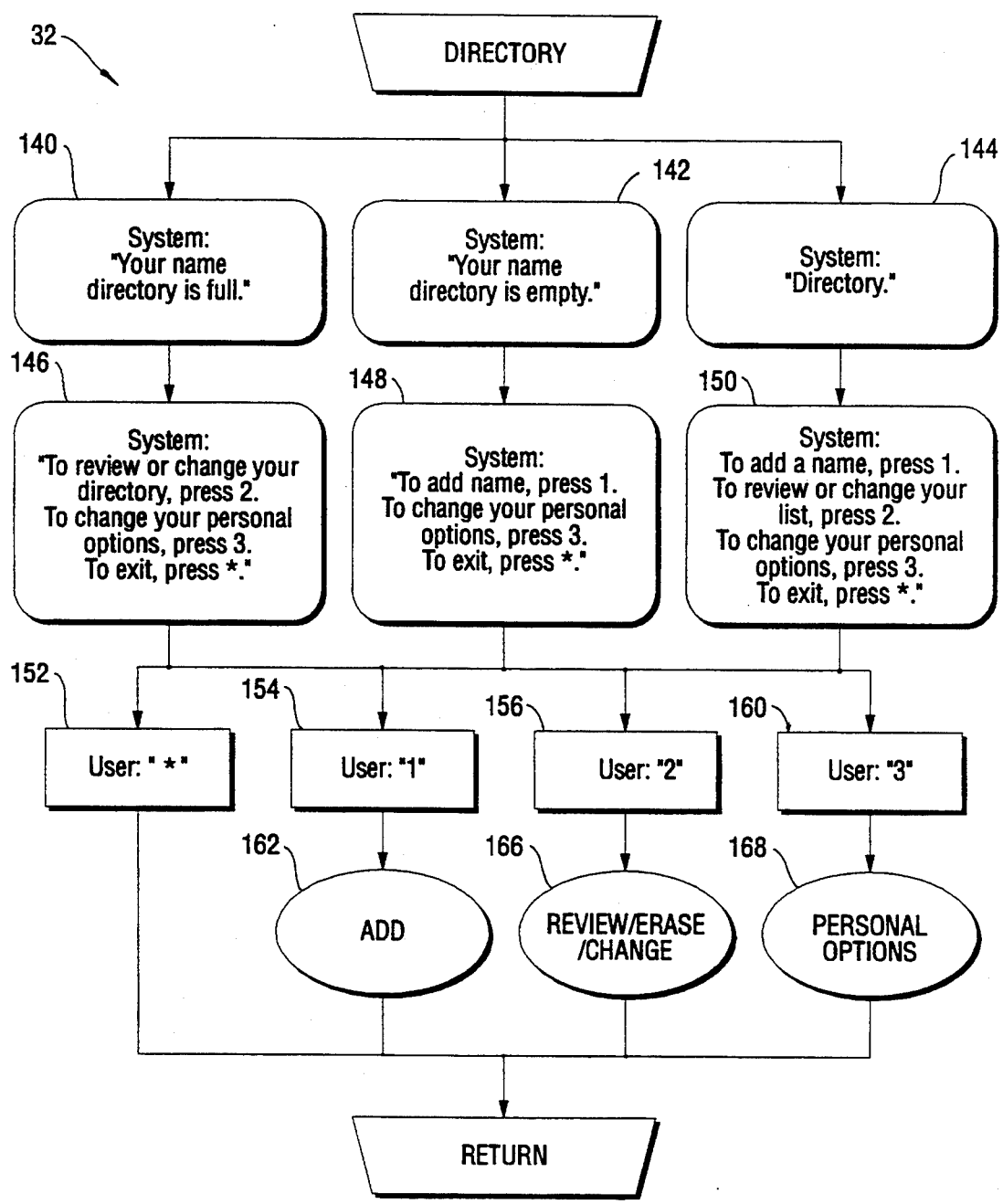
FIG. 5 is a flow chart representation of the directory procedure of one embodiment of the present invention.

Turning now to FIG. 5, the directory procedure, referred to generally by reference numeral 32, is presented. The system checks to determine whether or not the directory has reached its capacity. If the directory is full, this is verbally indicated to the user as indicated in step 140. The system then prompts the user to determine if the user wishes to review or change elements of the directory, change personal options for the user, or to exit the directory procedure as shown in step 146.

If, however, the system determines that the directory is empty, this fact is verbally related to the user in accordance with step 142. The system then prompts the user to determine if the user wishes to add a name to the directory, change personal options for the user, or to exit the directory procedure as shown in step 148.

If the system determines that the directory is neither full nor empty, this fact is verbally presented to the user as indicated in step 144. The purpose behind this step is to act in constraint of the user's choice of options. The user would not want to add to a full directory without first deleting and a user would have no need to execute a change to a directory which is empty.

The system then verbally prompts the user to determine if the user wishes to add a name to the directory, review or change the directory list, to change the user's personal options, or to exit the directory procedure. If the user presses * indicating that they wish to exit the directory procedure as shown in step 152, the procedure is exited. If the user presses 1 to indicate that they wish to add a name to the directory as shown in step 154, then the add procedure 162 is entered. If the user presses 2 indicating that he or she wishes to review or change an element in the directory, as shown in step 156, then the review/erase/change procedure 166 is entered. If the user presses a 3 indicating they wish to change their personal options, as shown in step 160, then the personal options procedure 168 is entered. The personal options procedure 168 could be used to store and modify specific information for each user. This information might include a personal identification number required for user access to provide system security, as well as user customization flags indicating the user's choice of features such as the choice of abbreviated system prompts.

Figure 6:
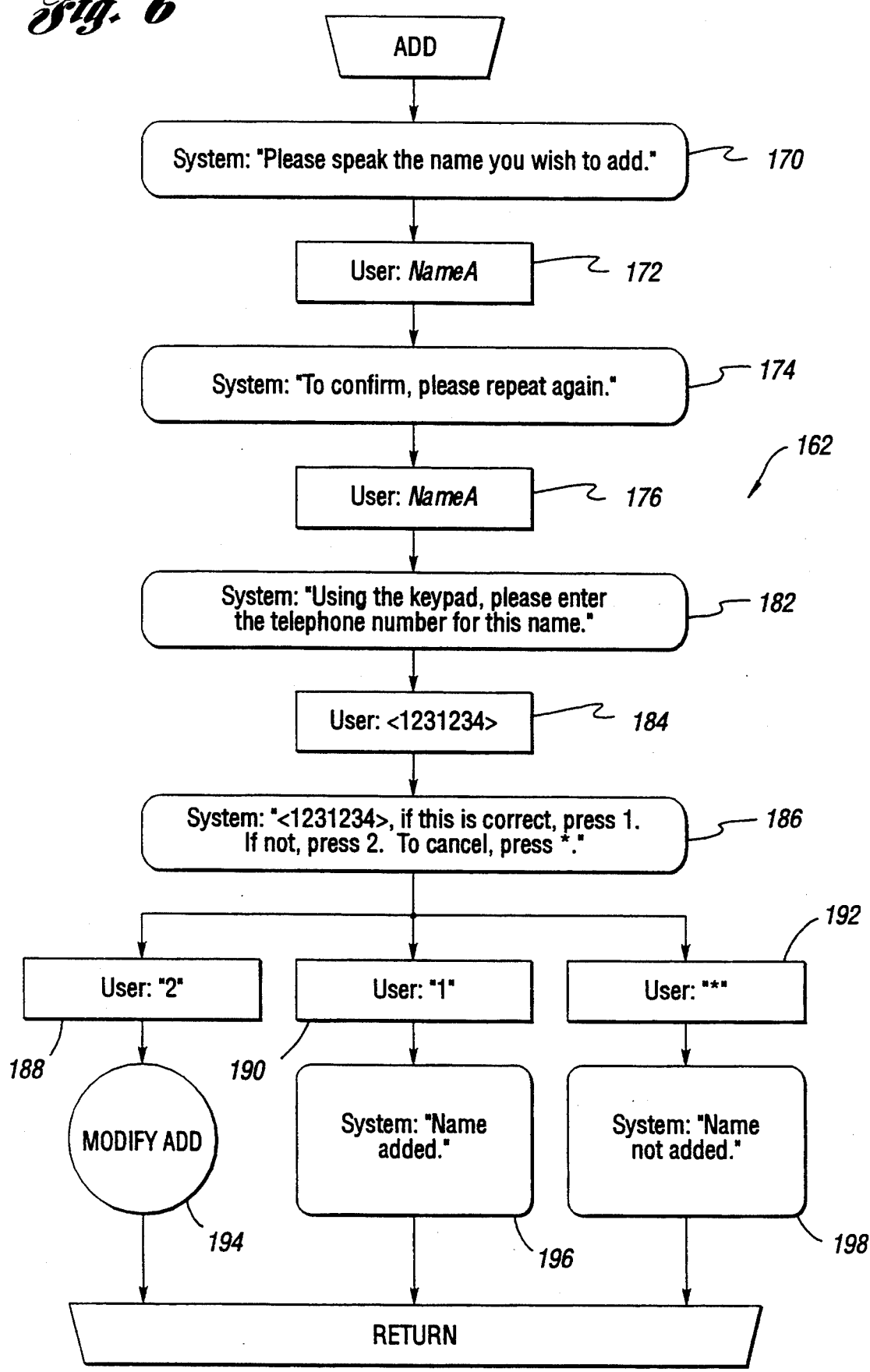
FIG. 6 is a flow chart of the add procedure of one embodiment of the present invention.

Turning now to FIG. 6, the add procedure, referred to generally by reference numeral 162, is shown. The system verbally prompts the user to speak the name that they wish to add to the directory as shown in step 170. The user then responds by speaking the requested name as shown in step 172. The system verbally replies by requesting that the user repeat the name again as shown in step 174. The user again speaks the name as shown in step 176. The system then verbally replies by prompting the user to enter the telephone number that corresponds to the entered name using the telephone keypad as shown in step 182. The user then enters the telephone number as shown in step 184. The system verbally replies by stating the entered telephone number and prompting the user to indicate if the number is correct, the number is incorrect, or the user wishes to exit the procedure as shown in step 186. If the user enters a 2 indicating that the telephone number is not correct, as shown in step 188, the modify/add procedure 194 is entered. If the user enters a 1 indicating that the telephone number is correct, as shown in step 190, then the name and telephone number are entered into the directory and this fact is verbally indicated to the user as shown in step 196. If the user enters a * indicating that he or she wishes to exit the procedure, as shown in step 192, the procedure is exited and the system verbally indicates to the user that the name was not added as shown in step 198.

Figure 7:
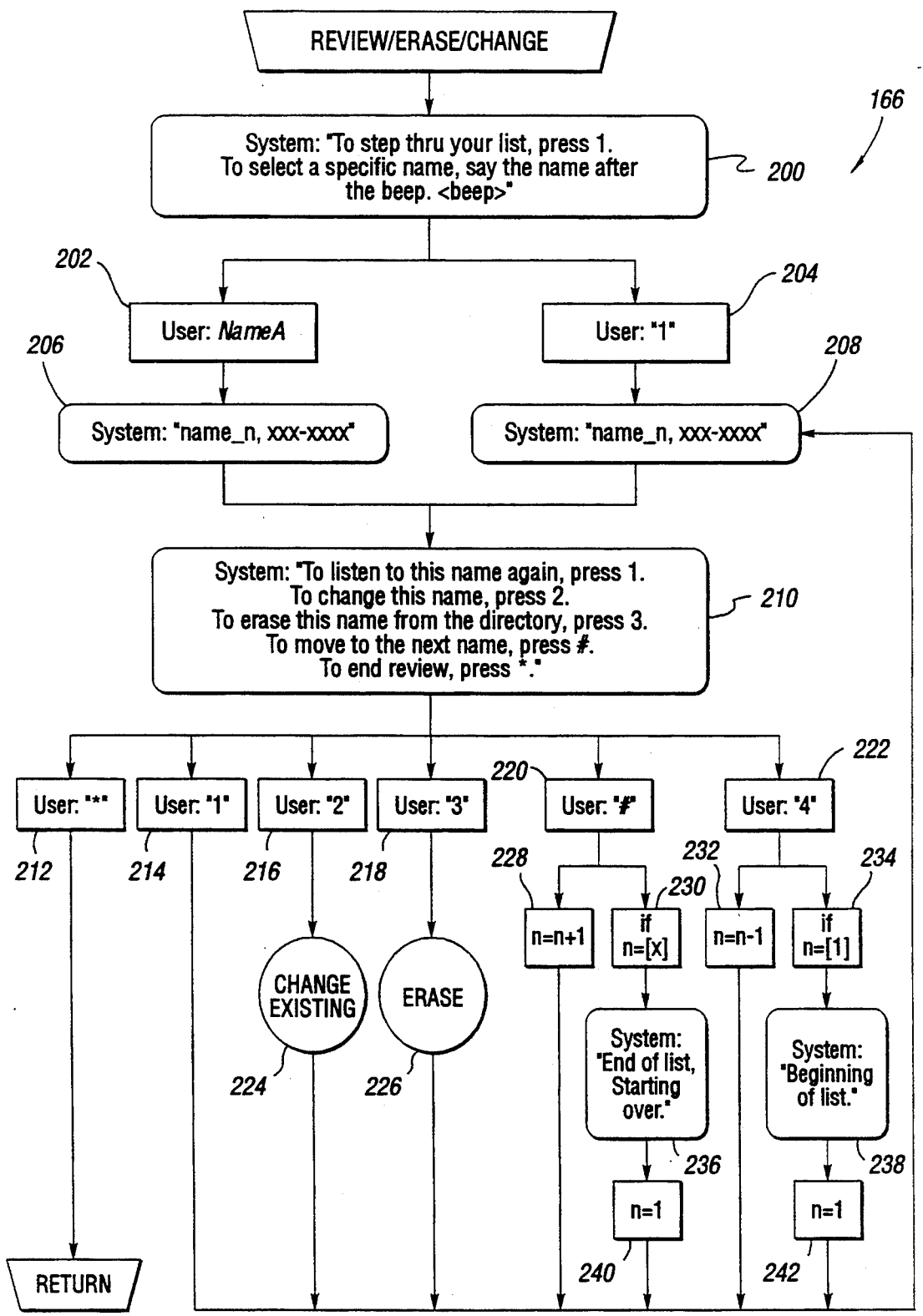
FIG. 7 is a flow chart representation of the review, erase and change procedure of one embodiment of the present invention.

Turning now to FIG. 7, the review/erase/change procedure, referred to generally by reference numeral 166, is shown. The system verbally prompts the user to choose between stepping through the list or selecting a specific name. The system then provides a tone and waits for a response from the user as shown in step 200. The tone is provided for the convenience of the user. However, in some applications, it might be desirable for this tone to be deleted. If a name is entered by the user as shown in step 202, the speech recognition algorithm determines the corresponding name and telephone number from the directory by comparing the spoken name to the stored speech template. The system verbally presents this name and telephone number to the user as shown in step 206. If, however, the user presses 1 to indicate that they wish to step through the list, as shown in step 204, then the first name in the directory is stated as well as its corresponding telephone number by the system as shown in step 208. In either case, the system verbally prompts the user to indicate whether they wish to listen to the name again, change the name, to erase the name from the directory, to move to the next name, or to exit the review procedure as shown in step 210.

The user chooses from these options as follows. If the user enters a * as shown in step 212 indicating that they wish to exit the review procedure, the review procedure is exited. If the user enters a 1 as shown in step 214 indicating that they wish to listen to the name again, then the method proceeds back to step 208. If the user enters a 2 as shown in step 216 indicating that they wish to change the name, the change existing procedure 224 is entered. If the user enters a 3 as shown in step 218, indicating that they wish to erase the name from the directory, the erase procedure 226 is entered. If the user enters a # as shown in step 220, the system moves to the next listing in the directory as shown in step 228 unless the user is at the last listing in the directory as shown in step 230 in which case the system verbally responds by indicating that the end of the list has been reached as shown in step 236 and by starting over with the first listing as shown by steps 240 and 208. If the user enters a 4 indicating that they wish to go back to the previous listing in the directory as shown in step 222, then the system goes to the previous listing as indicated by step 232 unless the current listing in the directory is the first listing as indicated by step 234 in which case the system verbally replies by indicating that the directory is at the beginning at shown in step 238 and by remaining at the first listing in the directory as indicated by step 242.

In an alternative embodiment of the present invention, the review procedure could be modified such that the listings would wrap-around while being stepped through. If the user indicates he or she wishes to access the previous listing and the first listing is currently being accessed, then the review procedure would proceed to the last listing in the directory.

Figure 8:
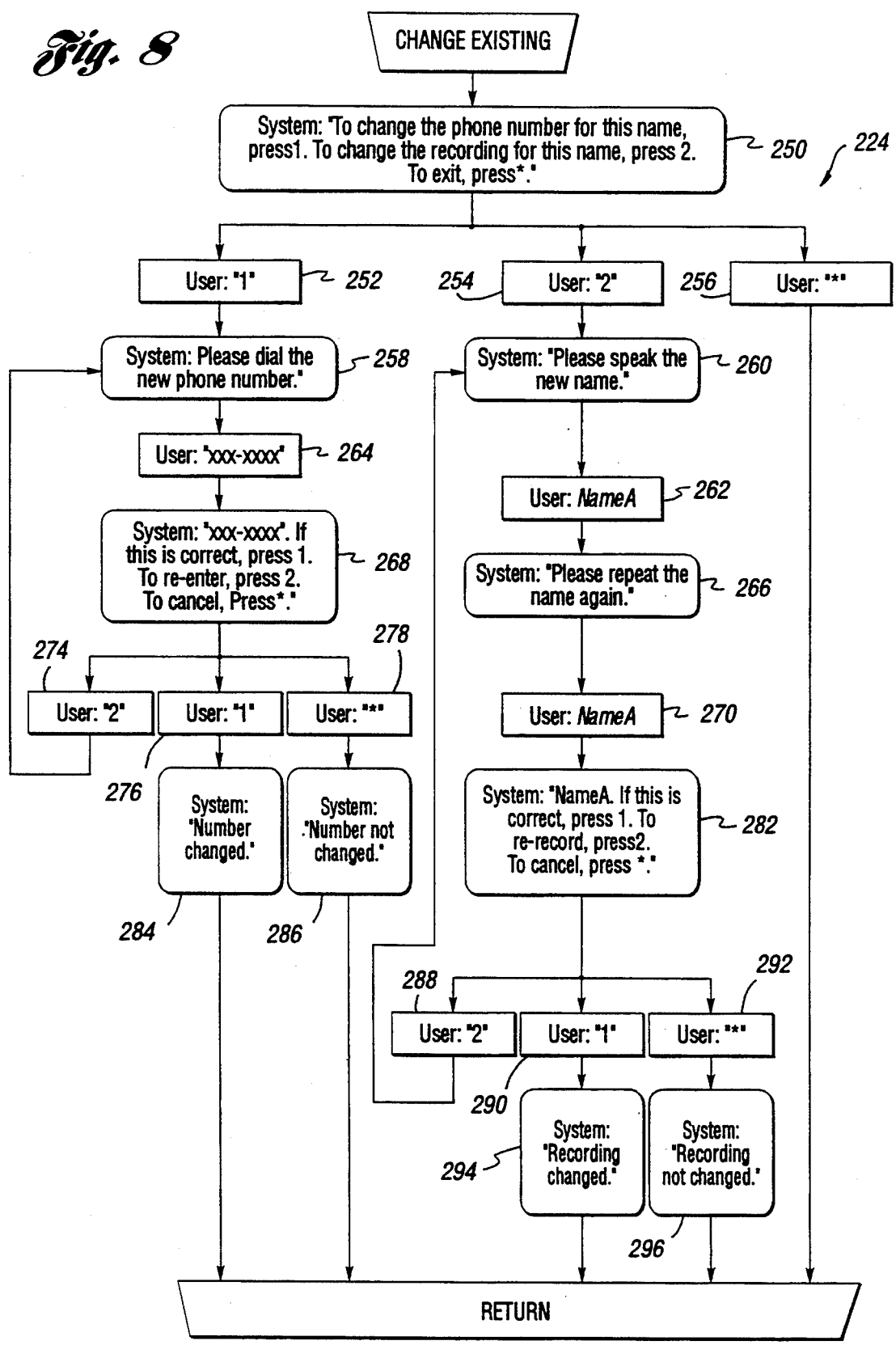
FIG. 8 is a flow chart representation of the change existing procedure of one embodiment of the present invention.

Turning now to FIG. 8, the change existing procedure, referred to generally by reference numeral 224, is shown. The system verbally prompts the user to indicate whether he or she wishes to change the telephone number for a given name, change the recording for a given name, or exit the procedure as indicated in step 250. If the user enters a 1 as shown in step 252 indicating that they wish to change the telephone number for a given name, the system verbally prompts the user to dial the new telephone number as shown in step 258. The user enters the new telephone number via the telephone keypad as shown in step 264. The system verbally replies by playing back the entered telephone number and by prompting the user to indicate whether the telephone number is correct, needs to be re-entered, or whether the user wishes to exit the procedure as shown in step 268.

The user indicates the correctness of the telephone number as follows. If the user enters a 2 as shown in step 274, indicating that the telephone number must be re-entered, then the system returns to step 258. If the user enters a 1 as shown in step 276 indicating that the telephone number is correct, the system verbally indicates to the user that the number was changed as shown in step 284. If the user enters a * as shown in step 278 indicating that the user wishes to exit the procedure, the system verbally indicates to the user that the number was not changed as shown in step 286 and the procedure is exited. If, however, the user indicates that they wish to change the recording for a given name by entering a 2 as shown in step 254, the system verbally prompts the user to speak the new name as shown in step 260. The user speaks the name as shown in 262 and the system verbally replies by again prompting the user to enter the name as shown in step 266. The user re-enters the name as shown in step 270. The system replies by replaying the name and prompting the user to indicate if the name is correct, if the name needs to be re-recorded, or if the user wishes to exit the procedure. If the user enters a 2 as shown in step 282 indicating that they wish to re-record the name, then the system returns to step 260. If the user enters a 1 as shown in step 290 indicating that the name is correct, the system verbally replies by indicating that the recording was changed as shown in step 294. If the user indicates a * as shown in step 292 indicating that the user wishes to exit the procedure, then the system verbally replies by indicating that the recording was not changed as shown in step 296.

Figure 9:
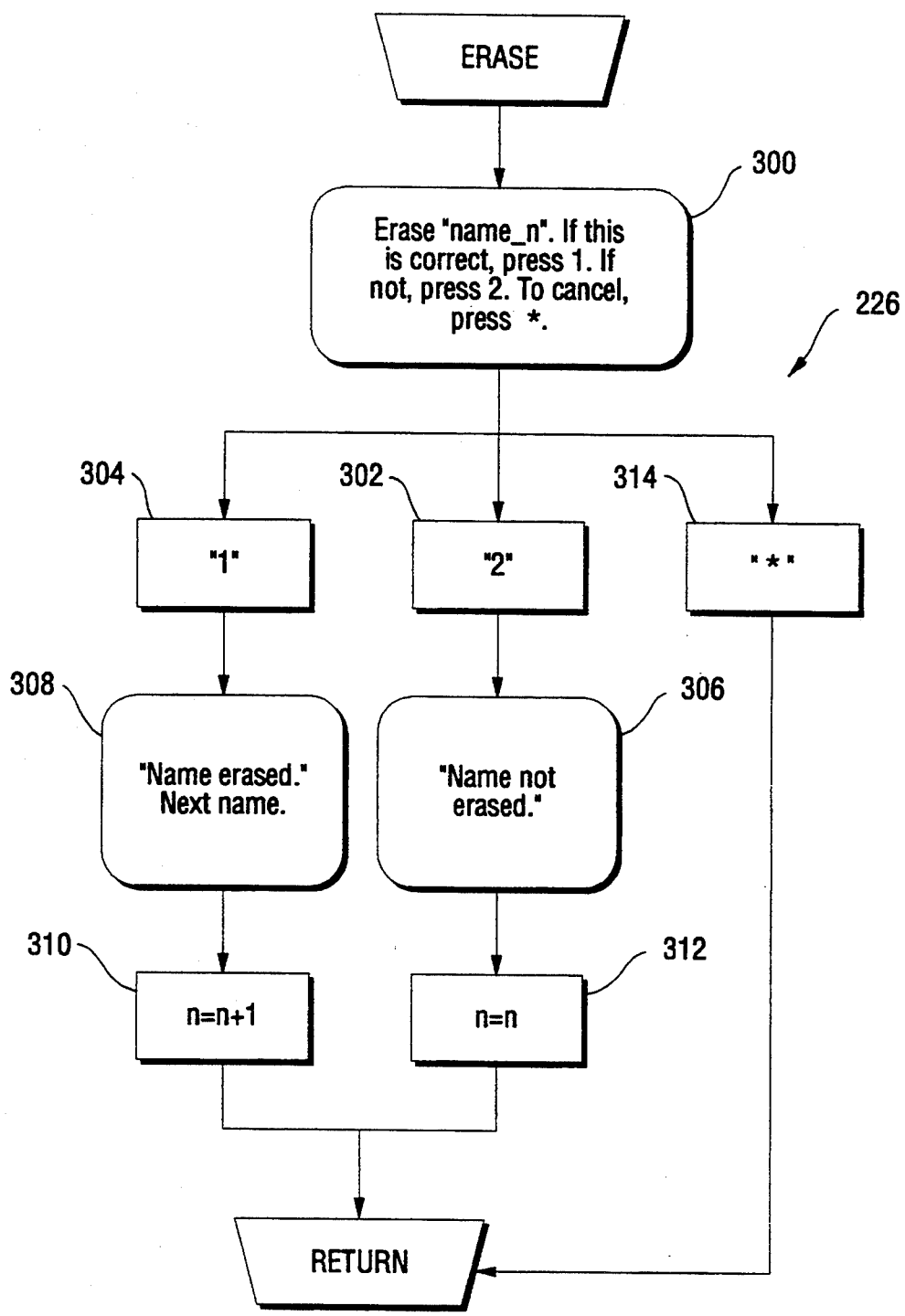
FIG. 9 is a flow chart representation of the erase procedure of one embodiment of the present invention.

Turning now to FIG. 9, the erase procedure referred to generally by reference numeral 226 is shown. The system verbally indicates the name segment corresponding to the current directory listing, and prompts the user to indicate if the name is correct, if the name is not correct, or if the erase procedure is to be cancelled as shown in step 300. If the user enters a 1 as shown in step 304 indicating that the name is correct, the name is erased and the next name in the directory becomes the current name as shown in steps 308 and 310. If the user enters a 2 as shown in step 302 indicating that the name is not to be erased, this fact is verbally transmitted to the user as shown in step 306 and the directory is indexed to the current directory listing as shown in step 312. If the user enters a * as shown in step 314, the procedure is exited.

Each of the previously described procedures could be modified to compensate for the case where the user either does not reply to a prompt from the system, responds incorrectly to a system prompt, or responds in a manner which is not recognized. The system could repeat the previous prompt or some derivation of this prompt indicating that the previous response was not properly given. Further, after a given number of re-prompts, the system could exit the current procedure. In some implementations of the method, it might be desirable to allow the user only a fixed amount of time to respond to a given prompt. If this time limit is exceeded, the system could proceed assuming that no response has been entered and by either reprompting the user or exiting the procedure.

One with ordinary skill in the art will recognize that the choice of the particular telephone keys for the user to implement the various options are, in a large part, arbitrary. One could substitute any of a wide variety of different symbols for the symbols listed within the scope of the present invention. Further, the present invention could be implemented with any of a wide variety of user input modes substituted for any or all of the respective key stroke inputs. For instance, the system could require the user to enter the directory procedure by speaking "directory", by touching a directory icon on a touch sensitive screen, by directing a special stylus or light pen, by pressing a function key on a special keypad or by dialing a sequence of digits on a rotary dial rather than entering keypad inputs such as *95 as shown in step 26 of FIG. 2.

One with ordinary skill in the art will also recognize that the number of times that speech segments need to be entered will vary with the speech recognition system and the corresponding algorithm which is used. Further, speech segments could be stored in a directory listing in many fashions. A speech template is one option, however, other options include the storage of digitized speech or separate speech phonemes.

One with ordinary skill in the art will moreover recognize that the telephone number in a directory listing could be replaced by a calling code, calling card number, voice mail box address, or a security code if the voice activated user interface were used in conjunction with special dialing or other telephone network interface functions.

In addition, one with ordinary skill in the art will recognize that a speech segment could consist of any spoken utterance intended to correspond to the telephone number to be dialed. For instance, the speech segment "hardware" could correspond to the telephone number for the local hardware store or the speech segment "call forwarding" could correspond to the service code, such as 72#, necessary to access a call forwarding feature. The only limitation is the speech segments be discriminatable by the speech recognition algorithm.

It should further be noted that the method of the present invention may be implemented in a wide variety of different manners encompassing many alternatives, modifications, and variations which are apparent to those of ordinary skill in the art. Accordingly, the present invention is intended to embrace all such alternatives, modifications, and variations as fall within the spirit and broad scope of the appended claims.

What is claimed is:

1. A method of telephone dialing in cooperation with a voice activated user interface having storage means for storing a directory of user entered speech segments and corresponding telephone numbers, the method comprising the steps of:
    receiving a user speech segment from said user corresponding to a party said user desires to call;
    comparing the user speech Segment to said directory to locate one of said entered speech segments;
    automatically dialing said corresponding stored telephone number if the user speech segment is recognized; and
    if the user speech segment is unrecognized:
    receiving a telephone number from said user corresponding to said unrecognized speech segment; and
    automatically adding said unrecognized speech segment and corresponding telephone number to said directory if indicated by said user.

2. The method as in claim 1, wherein the step of comparing further comprises the step of prompting said user to restate said unrecognized speech segment.

3. The method as in claim 1, wherein the step of adding further includes the step of receiving an indication signal from said user generated by a telephone keypad, said indication signal indicating that the unrecognized speech segment and corresponding telephone number are to be added to said directory.

4. The method as in claim 1, wherein the step of adding further includes the step of receiving an indication signal from said user generated by a rotary-dial mechanism, said indication signal indicating that the unrecognized speech segment and corresponding telephone number are to be added to said directory.

5. The method as in claim 1, wherein the step of adding further includes the step of receiving an indication signal from said user, said indication signal generated by a speech recognition system acting on an indication speech segment generated by said user, said indication signal indicating that the unrecognized speech segment and corresponding telephone number are to be added to said directory.

6. The method as in claim 1 further comprising the steps of:
    replacing said telephone number corresponding to said automatically added unrecognized speech segment if indicated by said user; and
    replacing said unrecognized speech segment if indicated by said user.

7. The method as in claim 1 wherein the user speech segment includes a name of the party the user desires to call.

8. The method as in claim 1 wherein the telephone number corresponding to said unrecognized speech segment is received from said user using a telephone key pad.

9. The method as in claim 1 wherein the telephone number corresponding to said unrecognized speech segment is received from said user using a rotary-dial mechanism.

10. The method as in claim 1 wherein the telephone number corresponding to said unrecognized speech segment is received from said user from a speech recognition system acting on a telephone number speech segment generated by said user.

11. A method of telephone dialing in cooperation with a voice activated user interface having storage means for storing a directory of user entered speech segments and corresponding telephone numbers, the method comprising the steps of:
    receiving a user speech segment from said user corresponding to a party said user desires to call;
    comparing the user speech segment to said directory to locate one of said entered speech segments;
    automatically dialing said corresponding stored telephone number if the user speech segment is recognized; and
    if the user speech segment is unrecognized:
    prompting said user to restate said unrecognized speech segment;
    receiving a telephone number from said user corresponding to said unrecognized speech segment; and
    automatically adding said unrecognized speech segment and corresponding telephone number to said directory in response to user input.

12. The method as in claim 11 wherein said user speech segment includes a name of said party said user desires to call.

13. The method as in claim 11 wherein the step of adding further comprises the step of receiving an indication signal from said user from a telephone key pad.

14. The method as in claim 11 wherein the step of adding further comprises the step of receiving an indication signal from said user from a rotary-dial mechanism.

15. The method as in claim 11 wherein the step of adding further comprises the step of receiving an indication signal from said user from a speech recognition system acting on a telephone number speech segment generated by said user.

* * * * *